United States Patent
Jang et al.

(10) Patent No.: US 8,526,396 B2
(45) Date of Patent: Sep. 3, 2013

(54) PERFORMING PROCESSING WITH RESPECT TO AN OVERHEAD MESSAGE FOR A MOBILE STATION IN TUNNEL MODE

(75) Inventors: Ke-Chi Jang, Plano, TX (US); Yi Song, Plano, TX (US); Geng Wu, Plano, TX (US)

(73) Assignee: Apple Inc., Cupertino, CA (US)

( * ) Notice: Subject to any disclaimer, the term of this patent is extended or adjusted under 35 U.S.C. 154(b) by 435 days.

(21) Appl. No.: 12/933,902

(22) PCT Filed: Apr. 17, 2009

(86) PCT No.: PCT/US2009/040908
§ 371 (c)(1),
(2), (4) Date: Sep. 22, 2010

(87) PCT Pub. No.: WO2009/129436
PCT Pub. Date: Oct. 22, 2009

(65) Prior Publication Data
US 2011/0013598 A1    Jan. 20, 2011

Related U.S. Application Data

(60) Provisional application No. 61/045,829, filed on Apr. 17, 2008.

(51) Int. Cl.
*H04W 4/00* (2009.01)
(52) U.S. Cl.
USPC .......................................................... 370/331

(58) Field of Classification Search
None
See application file for complete search history.

(56) References Cited

U.S. PATENT DOCUMENTS

| | | | |
|---|---|---|---|
| 2004/0120283 A1 | 6/2004 | Rezaiifar et al. | |
| 2005/0058136 A1 | 3/2005 | Lothberg et al. | |
| 2006/0072512 A1* | 4/2006 | Das et al. | 370/335 |
| 2006/0227747 A1* | 10/2006 | Kim et al. | 370/331 |
| 2006/0246885 A1 | 11/2006 | Lee | |
| 2007/0195820 A1* | 8/2007 | So et al. | 370/470 |
| 2007/0286152 A1 | 12/2007 | Prakash et al. | |
| 2008/0069048 A1 | 3/2008 | Prakash et al. | |
| 2009/0022104 A1* | 1/2009 | Cherian et al. | 370/331 |
| 2010/0142411 A1* | 6/2010 | Holm et al. | 370/259 |
| 2011/0117916 A1* | 5/2011 | Dahlen | 455/436 |

OTHER PUBLICATIONS

Extended Search Report in related European Patent Application No. 09732470.1—1857/2272229, Apr. 17, 2013, pp. 1-7.

* cited by examiner

*Primary Examiner* — John Blanton
(74) *Attorney, Agent, or Firm* — Meyertons, Hood, Kivlin, Kowert & Goetzel, P.C.

(57) ABSTRACT

A mobile station determines whether the mobile station is receiving an overhead message in tunnel mode during a handover procedure of the mobile station from a source wireless access network to a target wireless network. The source and target wireless access networks are according to different technologies. In response to determining that the mobile station is in the tunnel mode, tunnel mode processing of the overhead message is performed. In response to determining that the mobile station is not in the tunnel mode, different processing of the overhead message is performed.

20 Claims, 3 Drawing Sheets

PERFORMING PROCESSING WITH RESPECT TO AN OVERHEAD MESSAGE FOR A MOBILE STATION IN TUNNEL MODE

CROSS REFERENCE TO RELATED APPLICATIONS

This application is a national stage application under 35 U.S.C. §371 of PCT/US09/40908, filed on Apr. 17, 2009, which claims the benefit under 35 U.S.C. §119(e) of U.S. Provisional Application Ser. No. 61/045,829, filed Apr. 17, 2008.

TECHNICAL FIELD

The invention relates generally to performing processing with respect to an overhead message for a mobile station in tunnel mode.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) or UMTS (Universal Mobile Telecommunications System) technologies, defined by the Third Generation Partnership Project (3GPP); CDMA 2000 (Code Division Multiple Access 2000) technologies, defined by 3GPP2; or other wireless access technologies. The CDMA 2000 family of wireless access technologies includes the 1xRTT wireless access technology (generally used to perform circuit-switched communications), and the 1xEV-DO (or EV-DO) wireless access technology (used for communication of packet data and defined by the High Rate Packet Data (HRPD) specification, also known as the IS-856 specification).

More recently, further development of the 3GPP standards have lead to the 3GPP LTE (Long Term Evolution) wireless access technology. The LTE technology is the next generation enhancement of the UMTS technology to provide improved data speeds, reduced latency, and others.

Certain mobile stations are able to support multiple different types of wireless access technologies. For example, a mobile station can support both the LTE wireless access technology as well as the EV-DO wireless access technology. Such a mobile station can move between an LTE wireless access network and an EV-DO wireless access network.

When performing active handover of a mobile station between different wireless access networks (such as between an LTE wireless access network and an EV-DO wireless access network), conventional standards may not support the handling of certain types of messages that are sent from the access network to the mobile station during the handover process.

SUMMARY OF THE INVENTION

In general, according to an embodiment, a technique or mechanism is provided to allow for handover of a mobile station between different types of wireless access networks. In one embodiment, it is determined whether the mobile station is in a tunnel mode for receiving an overhead message during a handover procedure of the mobile station between different types of wireless access networks. In response to determining that the mobile station is in the tunnel mode, first processing with respect to the overhead message is performed. However, in response to determining that the mobile station is not in the tunnel mode, second, different processing is performed with respect to the overhead message.

Other or alternative features will become apparent from the following description, from the drawings, and from the claims.

DETAILED DESCRIPTION OF PREFERRED EMBODIMENTS OF THE INVENTION

Figure 1:
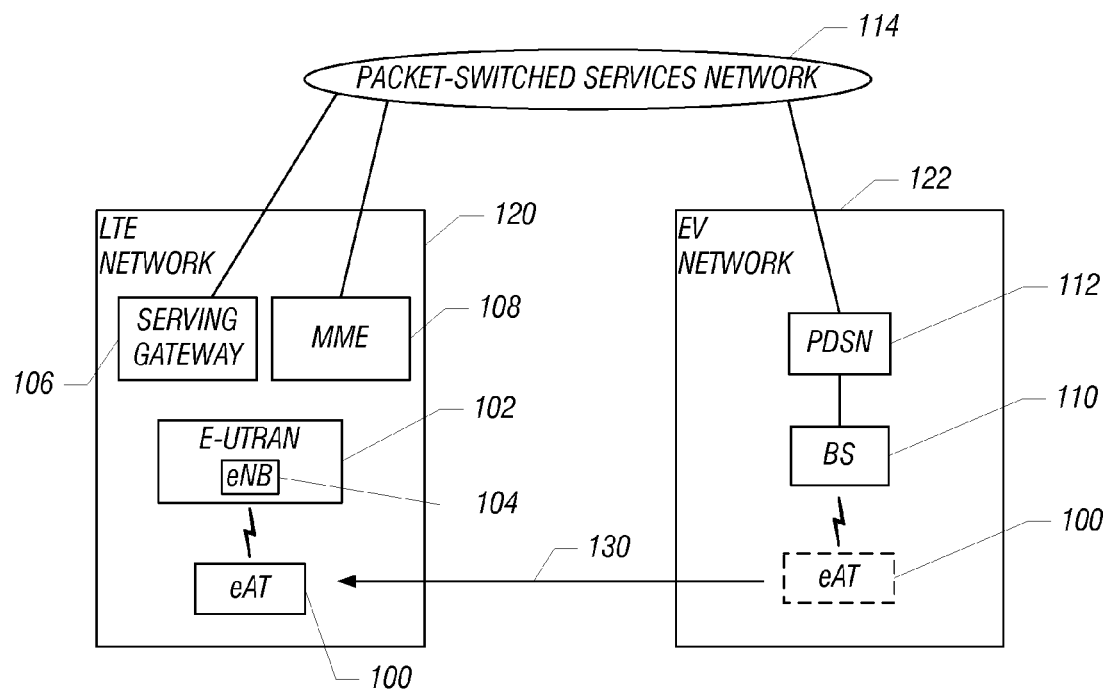
FIG. 1 is a block diagram of an exemplary communications arrangement that includes two different types of wireless access networks, in which preferred embodiments of the invention can be incorporated.

In accordance with preferred embodiments, a mechanism is provided to allow a multimode mobile station (a mobile station that is able to support multiple different types of wireless access technologies) to perform active handover (or other type of handover) between different types of wireless access networks. Active handover of a mobile station between different types of wireless access networks refers to performing handover of the mobile station from a source access network to a target access network while the mobile station remains connected for communicating traffic (e.g., data traffic, voice traffic, video traffic, etc.). In one example, the different types of wireless access networks include an LTE (Long-Term Evolution) wireless access network, as defined by the 3GPP standards. LTE is an enhancement of UMTS (Universal Mobile Telecommunications System) technologies, and is described in 3GPP TS 23.401 and 23.402. Another type of wireless access technology is the Evolution-Data Optimized (EV-DO or more simply "EV") wireless access technology, which is defined by the CDMA 2000 standards. Although reference is made to specific wireless access technologies in this description, note that other preferred embodiments are also applicable to other types of wireless access technologies. Also, although reference is made to active handovers, it is noted that techniques according to some embodiments are applicable in other handover contexts. For example, techniques according to some embodiments are applicable to idle handovers.

When the multimode mobile station is performing a handover from a first type of wireless access network (source wireless access network) to a second, different type of wireless access network (target wireless access network), the mobile station may have to continue to receive certain types of information from the source wireless access network after the mobile station has transitioned to the target wireless access network. Examples of such information include overhead messages that provide certain information that the mobile station uses to access the system in the source wireless access network. Once the mobile station has transitioned to the target wireless access network, an overhead message that is sent by the source wireless access network is tunneled through the target wireless access network. In accordance with preferred embodiments, the mobile station is able to receive such a tunneled overhead message and perform processing of the tunneled overhead message.

More specifically, according to some preferred embodiments, the mobile station is able to detect whether or not the mobile station is in a tunnel mode with respect to receiving of overhead messages from the source access network during a handover procedure. Before the handover, while the mobile station is attached to the source wireless access network, overhead messages are received over-the-air directly from a base station in the source wireless access network. However, once the mobile station has transitioned to the target wireless access network, the overhead messages are no longer received over-the-air in the source wireless access network, but rather, such overhead messages are tunneled through the target wireless access network to the mobile station. Tunneling of overhead messages from one wireless access network through another wireless access network refers to a tunnel mode of operation.

In accordance with some preferred embodiments, the mobile station performs different processing with respect to overhead messages depending upon whether the mobile station is in tunnel mode or not in tunnel mode. If the mobile station is not in tunnel mode, the mobile station is able to perform a first type of processing of the overhead messages received directly over-the-air from a base station in the source wireless access network. On the other hand, if the mobile station is in tunnel mode, the mobile station performs a second, different type of processing of tunneled overhead messages.

FIG. 1 is a block diagram of an exemplary communications arrangement that includes an LTE access network 120 and an EV access network 122. Both the LTE access network 120 and EV access network 122 are connected to a packet-switched services network 114 to allow for provision of packet-switched services to a mobile station 100. Packet-switched services include packet-switched data services (such as web browsing, e-mail, text chat, and so forth), packet-switched voice services (such as voice over Internet Protocol), or other packet-switched services. The mobile station 100 is a multimode mobile station that is able to perform communications in either the EV wireless access network 122 or the LTE wireless access network 120. Such a mobile station is also referred to as an enhanced access terminal (eAT).

Reference to an EV or EV-DO access network or access technology refers to any technology based on or evolved from the EV or EV-DO technology defined by the CDMA 2000 standards, whether or not the label "EV" or "EV-DO" is used. Similarly, reference to the LTE access network or access technology refers to any technology based on or evolved from the LTE technology defined by 3GPP, whether or not the label "LTE" is used.

The EV access network 122 includes a base station 110 that performs over-the-air communications (using radio frequency or RF signals, for example) with the mobile station 100 when the mobile station 100 is attached to the EV access network 122. The base station 110 is in turn connected to a packet data serving node (PDSN), which is the connection point between the base station 110 and the packet-switched services network 114.

The packet-switched services network 114 can include Internet Protocol (IP) networks that allow for provision of packet-switched services. The mobile station 100 can establish a communications session using the Session Initiation Protocol (SIP) as defined by Request for Comments (RFC) 3261, entitled "SIP:Session Initiation Protocol," dated June 2002. In one example, the packet-switched services network 114 may be an IP multimedia subsystem (IMS) network as defined by 3GPP. An IMS network includes various control functions for provision of IP multimedia services, including audio, video, text, chat, or any combination of the foregoing.

The LTE access network 120 includes an Evolved Universal Terrestrial Radio Access Network (E-UTRAN) 102, which includes an enhanced NodeB (eNB) 104, which is the equivalent of a base station used in the LTE access network 120. The LTE access network 120 also includes a mobility management entity (MME) 108, which performs various functions including handoff control. The LTE access network 120 also includes a serving gateway 106 for routing data packets between the LTE access network 120 and the external packet-switched services network 114.

Note that the components shown for the LTE access network 120 and the EV access network 122 in FIG. 1 are provided for purposes of example, as other arrangements can be used in other implementations.

As further shown in FIG. 1, the mobile station 100 can transition (130) between from the EV access network 122 to the LTE access network 120 (or vice versa). When the mobile station 100 is attached to the EV access network 122, the mobile station 100 is able to receive overhead messages directly over-the-air from the base station 110 of the EV access network 122. Once a mobile station 100 moves close to a border between the EV access network 122 and LTE access network, a handover may be performed to transition the mobile station 100 from the EV access network 122 to the LTE access network 120. During the handover procedure, overhead messages associated with the EV access network 122 are tunneled through the LTE access network 120.

When the mobile station is attached to the EV access network 122, the overhead messages received are overhead messages according to the format defined by standards for the EV access network. However, if the mobile station is attached to the LTE access network 120, then the phrase "overhead message" can refer to any container that contains the EV overhead parameters, where the container can be an LTE message or an information element carried by an LTE message. In tunnel mode, overhead parameters are sent by the EV access network 122 to the LTE access network 120, which packages the overhead parameters into an LTE container, or datafills information elements of an LTE message with values of the overhead parameters. More generally, an "overhead message" of a first type wireless access network in tunnel mode can refer to a container defined by a second type wireless access network that carries parameters of such overhead message of the first type wireless access network.

Figure 2:
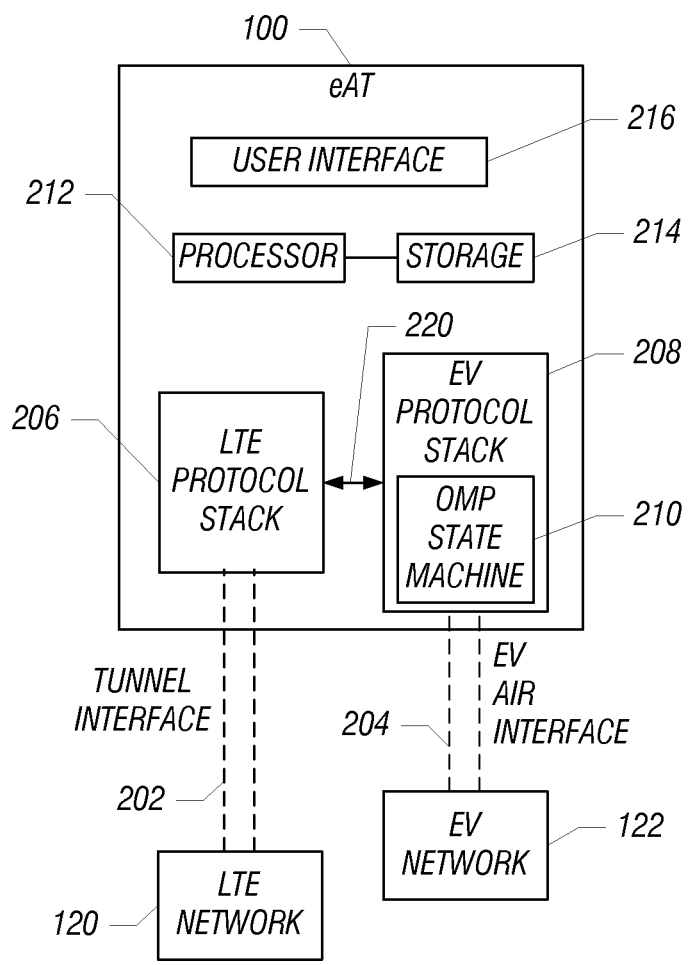
FIG. 2 is a block diagram of a multimode mobile station that is able to communicate with two different types of wireless access networks, according to a preferred embodiment.

FIG. 2 shows a block diagram of components of the multimode mobile station 100. In some implementations, the mobile station 100 is a single-receiver mobile station, which means that the mobile station is able to monitor just one wireless access technology (e.g., EV or LTE access technology) at one time. Alternatively, the mobile station 100 can be a dual-receiver mobile station, which means that mobile station can monitor two different wireless access technologies simultaneously.

The mobile station 100 includes a user interface 216 to allow a user to interact with the mobile station. Also, the mobile station 100 includes a processor 212 that is connected to a storage 214. The processor 212 is able to execute various software of the mobile station 100 to perform various mobile station tasks.

To allow the mobile station 100 to communicate with two different types of wireless access networks, the mobile station 100 includes an LTE protocol stack 206 and an EV protocol stack 208. The EV protocol stack 208 allows the mobile station 100 to communicate with the EV access network 122 over the EV air interface 204. The LTE protocol stack 206 allows the mobile station 100 to communicate over-the-air with the LTE access network 120. The EV protocol stack 208 and LTE protocol stack 206 of the mobile station 100 are part of a communications interface of the mobile station to allow the mobile station to communicate with a wireless access network.

As shown in FIG. 2, when the mobile station is attached to the LTE access network, a tunnel interface 202 is established to allow for certain overhead messages sent by the base station 110 (FIG. 1) in the EV access network 122 to be tunneled through the LTE access network 120 to the mobile station 100. A path 220 is provided between the LTE protocol stack 206 and the EV protocol stack 208 in the mobile station 100 to allow for tunneled overhead messages to be communicated through the LTE protocol stack 206 to the EV protocol stack 208 for proper processing.

According to preferred embodiments, the mobile station 100 performs different processing depending upon whether the mobile station 100 is in a tunnel mode or not in a tunnel mode with respect to overhead messages sent by the EV access network 122.

As further shown in FIG. 2, the EV protocol stack 208 includes an OMP (Overhead Messages Protocol) state machine 210 that has multiple states. The Overhead Messages Protocol (OMP), as defined by the 3GPP2 standards body, specifies procedures for processing overhead messages sent by the EV access network 122.

The OMP state machine 210 includes at least an inactive state and an active state. In the inactive state, the OMP state machine 210 waits for an Activate command. The inactive state is a state when the mobile station has not acquired an access network or is not required to receive overhead messages. In response to an Activate command, the mobile station transitions from the inactive state to the active state, in which the mobile station is able to receive overhead messages sent by the access network. Although reference is made to two states (an inactive state and an active state) in the described example, it is noted that techniques according to preferred embodiments can also be applied to an OMP state machine that has more than two states.

In accordance with preferred embodiments, the EV protocol stack 208 in the mobile station 100 is able to detect whether the mobile station is in tunnel mode or not in tunnel mode, such that processing of overhead messages can be performed accordingly.

Figure 3:
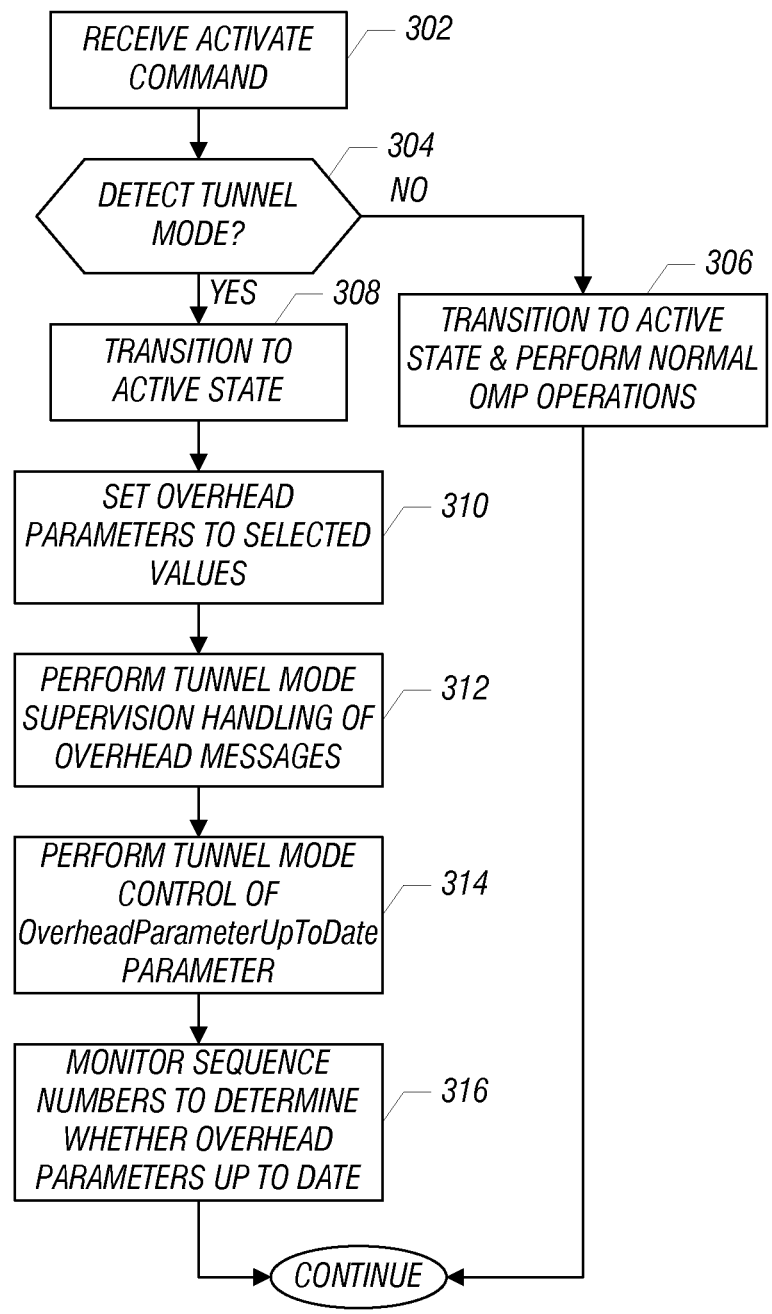
FIG. 3 is a flow diagram of a process performed by the multimode mobile station, according to an embodiment.

FIG. 3 is a flow diagram of a process performed by the mobile station, according to an embodiment. The mobile station receives (at 302) an Activate command, which can be generated inside the mobile station 100 when the mobile station has acquired an access network, such as the EV access network 122, or in response to another trigger that specifies that the mobile station has to process overhead messages.

Next, the mobile station detects (at 304) whether or not the mobile station is in a tunnel mode (in which the mobile station is attached to the LTE access network 120 and has to receive EV overhead messages through a tunnel from the EV access network 122 through the LTE access network 120). If the mobile station is not in tunnel mode, then the mobile station transitions to the active state of the OMP state machine 210, and performs normal OMP operations, which are OMP operations for processing overhead messages received directly over-the-air a base station in the EV access network 122.

However, if the mobile station detects that the mobile station is in tunnel mode, then the OMP state machine 210 is transitioned (at 308) to an active state in which processing of tunneled overhead messages is performed. When the mobile station is in tunnel mode, the processing that is performed with respect to EV overhead messages differ from processing of overhead messages received over-the-air from the EV access network 122. In tunnel mode, the content of an EV overhead message is carried in an LTE container, which can be an LTE message or an overhead information element(s) of an LTE message. Thus, when the mobile station is in tunnel mode, reference to an "overhead message" is intended to also cover such container(s). Because of bandwidth concerns associated with the air interface in the LTE access network 120, the overhead messages that are tunneled through the LTE access network 120 may not contain certain parameters of over-the-air EV overhead messages.

In tunnel mode, the mobile station sets overhead parameters to selected values (at 310). For overhead parameter values actually received in the LTE container(s), the mobile station sets the overhead parameters to those values. However, any overhead parameter not included in a tunneled overhead message are set to predetermined values. A "predetermined" value may be a default value (that is preconfigured into the mobile station 100), or alternatively, the "predetermined" value can be a prior value that was set by the mobile station when the mobile station was attached to the EV access network 122.

Examples of overhead messages include the Quick Configuration (QuickConfig) message and the SectorParameters message. The QuickConfig message is used to indicate a change in the overhead messages' content and to provide frequently changing information. The QuickConfig message includes, as examples, the following parameters: ColorCode (which identifies a cell sector in the EV access network 122); Sector Identifier (which is an identifier associated with the cell sector); SectorSignature (which is used to indicate that the content of a SectorParameters message has changed); AccessSignature (which is used to indicate that the content of an AccessParameters message has changed); Redirect (which is set to a value "1" if the access network is redirecting all mobile stations away from the access network); and other parameters.

The SectorParameters message is used to convey sector-specific information to mobile stations. Examples of the parameters in the SectorParameters message include: Sector Identifier (an identifier of the sector); Latitude (the latitude of the sector); Longitude (the longitude of the sector); and so forth.

The AccessParameters message is used to convey access channel information to a mobile station. Details regarding the QuickConfig, SectorParameters, and AccessParameters messages can be found in 3GPP2 C.S0024 specifications.

Examples of parameters that may not be included in overhead messages sent in tunnel mode include the Redirect parameter, the SectorSignature parameter and the AccessSignature parameter. These parameters can be set to default values, as preconfigured in the mobile station 100. Alternatively, if the mobile station had previously been attached to the EV access network 122, then previous values would have been set for such parameters; in such a scenario, the mobile station 100 is able to set such parameters to previous values, when such parameters are not included in the overhead messages.

The mobile station 100 also performs supervision handling (at 312) of overhead messages. Each of the QuickConfig and SectorParameters messages is associated with a corresponding supervision timer. When the mobile station 100 is attached to the EV access network 122, an overhead message received over-the-air will cause the corresponding one of these supervision timers to be reset (restarted). Expiration of a supervision timer would cause a connection to the EV access network to be lost. In accordance with some preferred embodiments, a similar behavior is provided for supervision timers when the mobile station 100 is in tunnel mode. Thus, for example, if a QuickConfig overhead message is received in tunnel mode, an indication of such QuickConfig messages is provided from the LTE protocol stack 206 to the EV protocol stack 208, which would then restart the QuickConfig supervision timer. Similarly, when the mobile station 100 receives a SectorParameters message in tunnel mode, an indication of such message would be provided from the LTE protocol stack 206 to the EV protocol stack 208, and the SectorParameters supervision timer can be restarted.

In an alternative embodiment, instead of restarting supervision timers in response to receipt of overhead messages in tunnel mode, the EV protocol stack 208 can choose to ignore the supervision timers when the mobile station 100 is in tunnel mode.

The mobile station 100 when in tunnel mode also performs (at 314) tunnel-mode control of the following parameter: OverheadParameterUpToDate. The OverheadParameterUpToDate parameter is set to a value "0" when overhead parameters are considered to be not up-to-date. However, when this parameter is set to the value "1", then the overhead parameters in the mobile station 100 are considered to be up-to-date. In tunnel mode, according to preferred embodiments, the OverheadParameterUpToDate parameter can be set to a default value of "0" to assume that overhead parameters when in tunnel mode are not up-to-date. However, when the mobile station receives a tunneled overhead parameter information element, and if the mobile station has updated overhead parameters stored in the mobile station in response to such overhead parameter information element, then the EV protocol stack 208 can update the OverheadParameterUpToDate parameter to the value "1".

In addition, the OverheadParameterUpToDate parameter can be set to the value "0" when the mobile station exits tunnel mode, which means that the mobile station would have moved back to the EV access network. Setting the OverheadParameterUpToDate parameter to "0" upon exiting tunnel mode would then force the mobile station to use the over-the-air overhead parameters, rather than the tunneled parameters previously received.

The mobile station 100 can also monitor (at 316) sequence numbers of a tunneled overhead parameter information element, if such sequence numbers are included. The mobile station 100 can compare the sequence numbers to determine whether the stored overhead parameters are up-to-date. If not up-to-date, the OverheadParameterUpToDate parameter can be set to the value "0".

The various tasks described above can be performed by software. Instructions of such software are executed on a processor (e.g., processor 212 in FIG. 2). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method performed by a mobile station, comprising:
   determining whether the mobile station is in a tunnel mode for receiving an overhead message during a handover procedure of the mobile station between different types of wireless access networks;
   in response to determining that the mobile station is in the tunnel mode, performing first processing with respect to the overhead message, wherein the overhead message is associated with a collection of parameters, and wherein performing the first processing comprises setting any parameter that is part of the collection and that is not received in the overhead message in tunnel mode to a corresponding selected value; and
   in response to determining that the mobile station is not in the tunnel mode, performing second, different processing with respect to the overhead message.

2. The method of claim 1, wherein setting the parameter that is not received in the overhead message to the corresponding selected value comprises setting the parameter that is not received in the overhead message to a default value.

3. The method of claim 1, wherein setting the parameter that is not received in the overhead message to the corresponding selected value comprises setting the parameter that is not received in the overhead message to a previous value of the parameter.

4. The method of claim 3, wherein the handover procedure is from a source wireless access network to a target wireless access network, and wherein the parameter that is not received in the overhead message is set to a previous value of the parameter assigned when the mobile station is attached to the source wireless access network.

5. The method of claim 1, wherein the different types of wireless access networks include a source wireless access network and a target wireless access network, the method further comprising:
   when in tunnel mode, the mobile station receiving the overhead message associated with the source wireless access network that is tunneled through the target wireless access network.

6. The method of claim 5, further comprising:
   when not in tunnel mode, the mobile station receiving the overhead message directly over-the-air from a base station of the source wireless access network.

7. The method of claim 1, further comprising receiving the overhead message that is an EV-DO overhead message.

8. The method of claim 7, further comprising:
   when in tunnel mode, the mobile station receiving the EV-DO overhead message through an LTE (Long Term Evolution) access network.

9. A mobile station comprising:
   a communications interface to communicate over-the-air;

a processor to:
  determine whether the mobile station is receiving an overhead message in tunnel mode during a handover procedure of the mobile station from a source wireless access network to a target wireless network, wherein the source and target wireless access networks supports different technologies;
  in response to determining that the mobile station is in the tunnel mode, performing tunnel mode processing of the overhead message;
  when in tunnel mode, adjust a value of an indicator for indicating whether parameters of the overhead message are up to date; and
  in response to determining that the mobile station is not in the tunnel mode, performing different processing of the overhead message.

10. The mobile station of claim 9, wherein the source wireless access network is part of an EV-DO (Evolution-Data Optimized) access network, and the target wireless access network is part of an LTE (Long Term Evolution) access network.

11. The mobile station of claim 9, wherein the overhead message is associated with a collection of parameters, and wherein the processor is to further:
  set any parameter that is part of the collection and that is not received in the overhead message in tunnel mode to a corresponding selected value.

12. The mobile station of claim 9, wherein the value of the indicator is adjusted by:
  in response to receiving the overhead message in tunnel mode and storing the overhead message, set the value of the indicator to indicate that the parameters of the overhead message are up to date.

13. The mobile station of claim 12, wherein the value of the indicator is adjusted by:
  in response to initially entering the tunnel mode or exiting the tunnel mode, set the value of the indicator to indicate that the parameters of the overhead message are not up to date.

14. The mobile station of claim 9, wherein the overhead message is associated with a timer that upon expiration causes a connection to be lost, and wherein the processor is to further:
  in response to receiving the overhead message in tunnel mode, reset the timer.

15. The mobile station of claim 9, wherein the overhead message is associated with a timer that upon expiration causes a connection to be lost, and wherein the processor is to further:
  disregard the timer when in the tunnel mode.

16. At least one non-transitory machine-readable storage medium storing instructions that upon execution cause a mobile station to:
  determine whether the mobile station is receiving an overhead message in tunnel mode during a handover procedure of the mobile station from a source wireless access network to a target wireless network, wherein the source and target wireless access networks are according to different technologies;
  in response to determining that the mobile station is in the tunnel mode, performing tunnel mode processing of the overhead message, wherein the overhead message is associated with a collection of parameters, and wherein performing the tunnel mode processing comprises setting any parameter that is part of the collection and that is not received in the overhead message in the tunnel mode to a corresponding selected value; and
  in response to determining that the mobile station is not in the tunnel mode, perform different processing of the overhead message.

17. The article of claim 16, wherein the instructions upon execution cause the mobile station to further:
  when in tunnel mode, receive the overhead message sent by the source wireless access network that is tunneled through the target wireless access network.

18. The article of claim 17, wherein the instructions upon execution cause the mobile station to further:
  when not in tunnel mode, receive the overhead message directly over-the-air from a base station of the source wireless access network.

19. A mobile station comprising:
a communications interface to communicate over-the-air;
a processor to:
  determine whether the mobile station is receiving an overhead message in tunnel mode during a handover procedure of the mobile station from a source wireless access network to a target wireless network, wherein the source and target wireless access networks supports different technologies;
  in response to determining that the mobile station is in the tunnel mode, performing tunnel mode processing of the overhead message, wherein the overhead message is associated with a collection of parameters, and wherein the processor is to further set any parameter that is part of the collection and that is not received in the overhead message in tunnel mode to a corresponding selected value; and
  in response to determining that the mobile station is not in the tunnel mode, performing different processing of the overhead message.

20. A mobile station comprising:
a communications interface to communicate over-the-air;
a processor to:
  determine whether the mobile station is receiving an overhead message in tunnel mode during a handover procedure of the mobile station from a source wireless access network to a target wireless network, wherein the source and target wireless access networks supports different technologies;
  in response to determining that the mobile station is in the tunnel mode, performing tunnel mode processing of the overhead message, wherein the overhead message is associated with a timer that upon expiration causes a connection to be lost, and wherein the processor is to further disregard the timer when in the tunnel mode; and
  in response to determining that the mobile station is not in the tunnel mode, performing different processing of the overhead message.

* * * * *